(No Model.)

E. KELLS
PROCESS OF AND APPARATUS FOR FREEZING PARAFFINE AND OTHER PETROLEUM PRODUCTS.

No. 261,236. Patented July 18, 1882.

Witness.
M. E. Norton
Frank W. Tibbitts

Inventor,
Edward Kells,
By Geo. W. Tibbitts Atty.

N. PETERS, Photo-Lithographer, Washington, D. C.

UNITED STATES PATENT OFFICE.

EDWARD KELLS, OF CLEVELAND, OHIO, ASSIGNOR OF ONE-HALF TO DAVID A. DANGLER, OF SAME PLACE.

PROCESS OF AND APPARATUS FOR FREEZING PARAFFINE AND OTHER PETROLEUM PRODUCTS.

SPECIFICATION forming part of Letters Patent No. 261,236, dated July 18, 1882.

Application filed May 22, 1882. (No model.)

*To all whom it may concern:*

Be it known that I, EDWARD KELLS, of Cleveland, in the county of Cuyahoga and State of Ohio, have invented a certain new and useful Process of and Apparatus for Chilling Paraffine and all Products of Petroleum, of which the following is a specification.

The nature and objects of this invention will fully appear from the subjoined description, when considered in connection with the accompanying drawings, in which—

Figure 1:
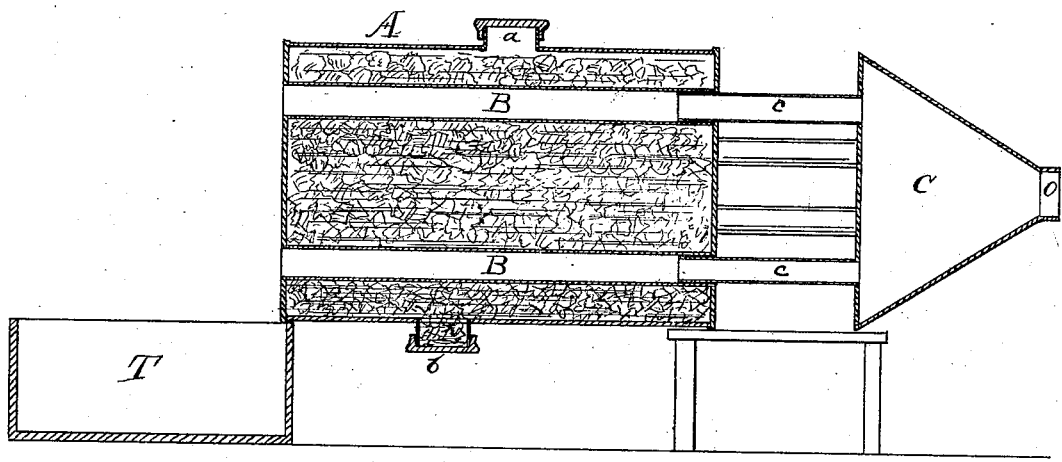
Figure 2:
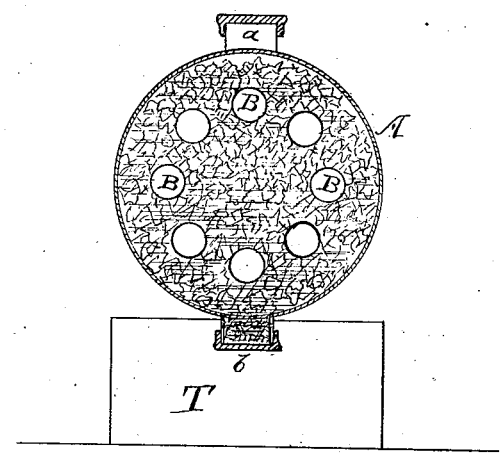

Figure 1 is a longitudinal section of the apparatus for carrying on my process. Fig. 2 is a transverse section of the same.

This invention relates to the chilling or freezing of paraffine or other products of petroleum during the process of refining; and it consists in forcing the oil, by means of a suitable pump, through a series of pipes situated within a freezing medium, whereby the process is greatly facilitated, resulting in a great saving of time, labor, and expense.

Heretofore the freezing process consisted in placing the product in metal cans, and then placing the cans in a refrigerating-box, surrounding them with ice and salt. This required considerable time and the slow and tedious labor of several men to accomplish the required results.

My improved method is as follows: I make a suitable cylindrical vessel, A, provided with a series of pipes, B B, extending through from head to head, open at one end. To the top of the vessel A is made an opening, *a*, provided with a suitable cover, and to the bottom is also provided a like opening, *b*. The top opening is provided for placing in the refrigerating element, which consists of brine supplied from a suitable tank or vessel located above and near the said vessel A. In connection with the said vessel A is provided a conical vessel or chamber, C, the head of which is attached to the protruding ends of the pipes B B. The protruding portions *c c* of said pipes are left exposed for the purpose of allowing the material to gradually cool before it reaches the pipes B to prevent clogging by the too sudden freezing of the material. In the apex of the chamber C is an opening, O, through which the material to be treated enters.

To carry out my process the paraffine or other product is to be forced through the said chamber C, thence through the said pipes B by means of a suitable force-pump, (not shown,) which, after it enters the chamber, is divided into as many streams as there are pipes, for the purpose of passing the material through the freezing process in several smaller volumes, whereby the whole mass is the more readily and expeditiously affected by the cold. The chilled or frozen material is discharged at the open ends of the pipes B B, and is deposited into suitable tubs, T.

The vessel A contains no ice, only the brine from the tank above. This brine may be returned to the tank from the vessel A by drawing it off from below at opening *b*, and conveying it, by means of a pump or otherwise, to be used over again.

Having described my invention, I claim—

1. The herein-described process of freezing paraffine and other products of petroleum, the same consisting in forcing the material through pipes inclosed in a refrigerating-vessel by means substantially as described.

2. In an apparatus for freezing paraffine or other products of petroleum, the combination, with the refrigerating-vessel A, provided with the open pipes B B, and containing the refrigerating elements enveloping said pipes, of the conical chamber C, connected at a short distance from said vessel A, and arranged to convey the material through the freezer in separate streams, substantially in the manner and for the purpose specified.

EDWARD KELLS.

Witnesses:
M. G. NORTON,
FRANK R. TIBBITTS.